Patented Apr. 3, 1934

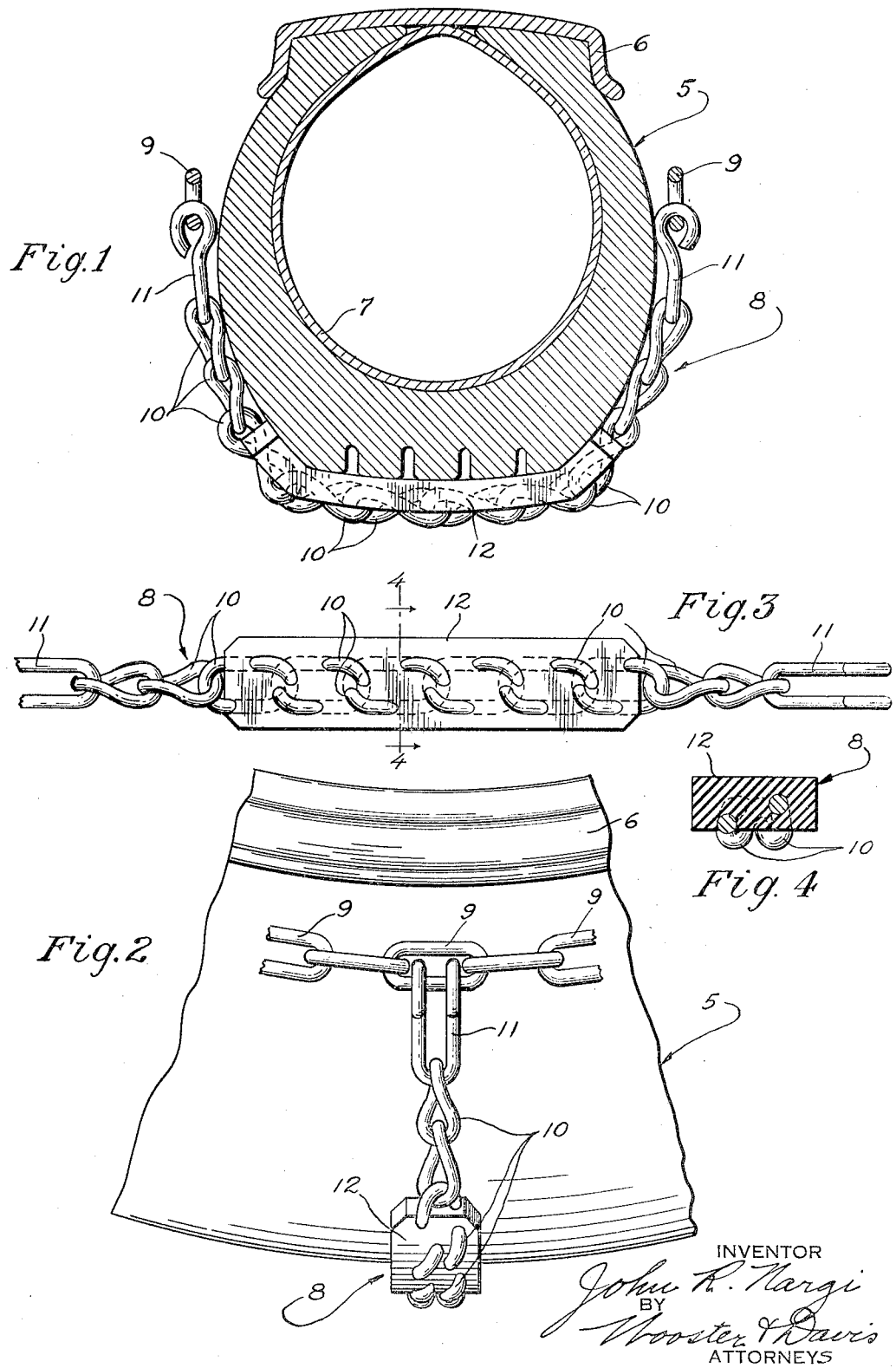

1,953,495

UNITED STATES PATENT OFFICE 1,953,495

CROSS CHAIN FOR ANTISKID CHAINS

John R. Nargi, Bridgeport, Conn., assignor of one-half to Michael Nargi, Bridgeport, Conn.

Application March 17, 1933, Serial No. 661,278

2 Claims. (Cl. 152—14)

This invention relates to new and useful improvements in anti-skid means for vehicle, particularly automobile, wheels and comprises an improved construction of cross chain for anti-skid chains.

An object of the invention is to provide an anti-skid cross chain including means whereby the links are held together and prevented from separating as they wear, the said means serving to prevent the cross chain's links turning over on the tire, and adding to their life and rendering them silent.

Another object is to provide an anti-skid cross chain wherein the ground or road engaging links are embedded in a strip of vulcanized live rubber, a portion of each link being exposed at the under or road engaging side of the strip to engage the road, and the rubber acting to receive the blow of the cross members on the road surface to thus protect the links from hammering on the road surface.

Other objects and advantages will become apparent from a consideration of the following detailed description taken in connection with the accompanying drawing wherein a satisfactory embodiment of the invention is shown. However, it will be understood that the invention is not limited to the details disclosed but includes all such variations and modifications as fall within the spirit of the invention and the scope of the appended claims.

In the drawing:

Fig. 1 is a transverse sectional view through a pneumatic tire showing one of my improved cross chains in place thereon;

Fig. 2 is a side elevational view showing a portion of a tire with the improved cross chain in place thereon;

Fig. 3 is a bottom plan view of the improved cross chain; and

Fig. 4 is a transverse sectional view taken substantially along the line 4—4 of Fig. 3.

Referring in detail to the drawing, at 5 is shown a portion of any tire which may be mounted on any rim 6 and which may be pneumatic and include an inner tube 7. The present invention relates to the cross chains of anti-skid chains, and one cross chain made in accordance with the invention is shown and is generally designated 8. In actual use a plurality of cross chains 8 are arranged in spaced relation and extend across the tread of the tire and these cross chains may be connected to circumferentially extending chains or flexible members 9 arranged one at each side of the tire.

Cross chain 8 comprises a plurality of connected twisted metal links 10 forming a short chain which at each of its ends may carry a hook 11 for connection with links of the circumferential or side chains 9. A portion of the links 10 are inclosed or embedded in a strip 12 of live vulcanized rubber, a portion of each link being exposed as shown at the under or road engaging side of said strip. This strip 12 may, of course, be of a length substantially equal to the length of the cross chain although it will satisfactorily serve its purpose when it is of such length as to enclose the ground or road engaging links of the cross chain.

The live rubber strip is vulcanized to the links of the cross chain and will wear well and have long life and will yield sufficiently so that there will always be some metal of the cross links exposed to engage the road. As the links 10 wear down they will be held together by the rubber so that the cross chain will not break and have its severed portions flying outwardly thumping against the automobile fender at each revolution of a wheel. It will be noted that the strip 12 is somewhat wider than the links 10 so that the strip extends beyond or laterally of the links. The strips being thus relatively wide serve to prevent the cross chains turning over on the tire. The links are not extended through the upper or inner side of the rubber whereby the latter is smooth on its tire tread engaging surface and the tire is not worn by engagement with relatively small portions of the links.

Also, the rubber strip saves or protects the links on a dry road so that the cross chain wears much longer. This is partially due to the fact that the rubber being wider than the links 10 will engage the road in advance of said links and take up the shock and protect the links from banging or hammering on the road. In this way the strip of rubber serves to make the chain silent and the rubber adds to the life of the chain since the rubber prevents the hammering of the metal links on the road surface. This is important as one of the chief causes of breakage of uncovered and unprotected metal links is the hammering of the links on the road surface at high speeds, particularly if the chain is somewhat loose so that the centrifugal action throws them outwardly away from the surface of the tire. These blows cause rapid wear of the links and quick breakage. The rubber covering of my construction protects the links giving much longer life. It also makes the chain practically silent. Furthermore if a link should break it and the remaining links will be held in position by the rubber so they will not bang against the mud guard and the cross chain still is useful as an anti-skid element. As the links wear down the rubber wears somewhat and in addition yields so that some metal is always exposed to engage the road surface.

Having thus set forth the nature of my invention, what I claim is:

1. In a cross member for an anti-skid chain, a strip of live vulcanized rubber, a chain comprising a series of connected metal loops of which each road engaging loop includes portions in different planes, said road engaging loops each partially embedded in said rubber strip and extending below the lower surface thereof, and means to connect the ends of the cross member to the side chains of an anti-skid chain.

2. In a cross member for an anti-skid chain, a strip of live vulcanized rubber, a chain comprising a series of connected metal loops of which each road engaging loop includes portions in different planes, said road engaging loops each partially embedded in said rubber strip and extending below the lower surface thereof, said strip of a width to extend laterally of the said loops for a distance sufficient to engage a road surface in advance of the loops as a wheel equipped with the cross member is rotated, and means to connect the ends of the cross member to the side chains of an anti-skid chain.

JOHN R. NARGI.